J. C. POTTER.
AUTOMATIC TURRET LATHE.
APPLICATION FILED NOV. 13, 1909.

1,115,973.

Patented Nov. 3, 1914.
4 SHEETS—SHEET 1.

Witnesses
M. L. Pugh
A. B. Evans

Inventor
James C. Potter,
by Chas. J. Williamson
Attorney

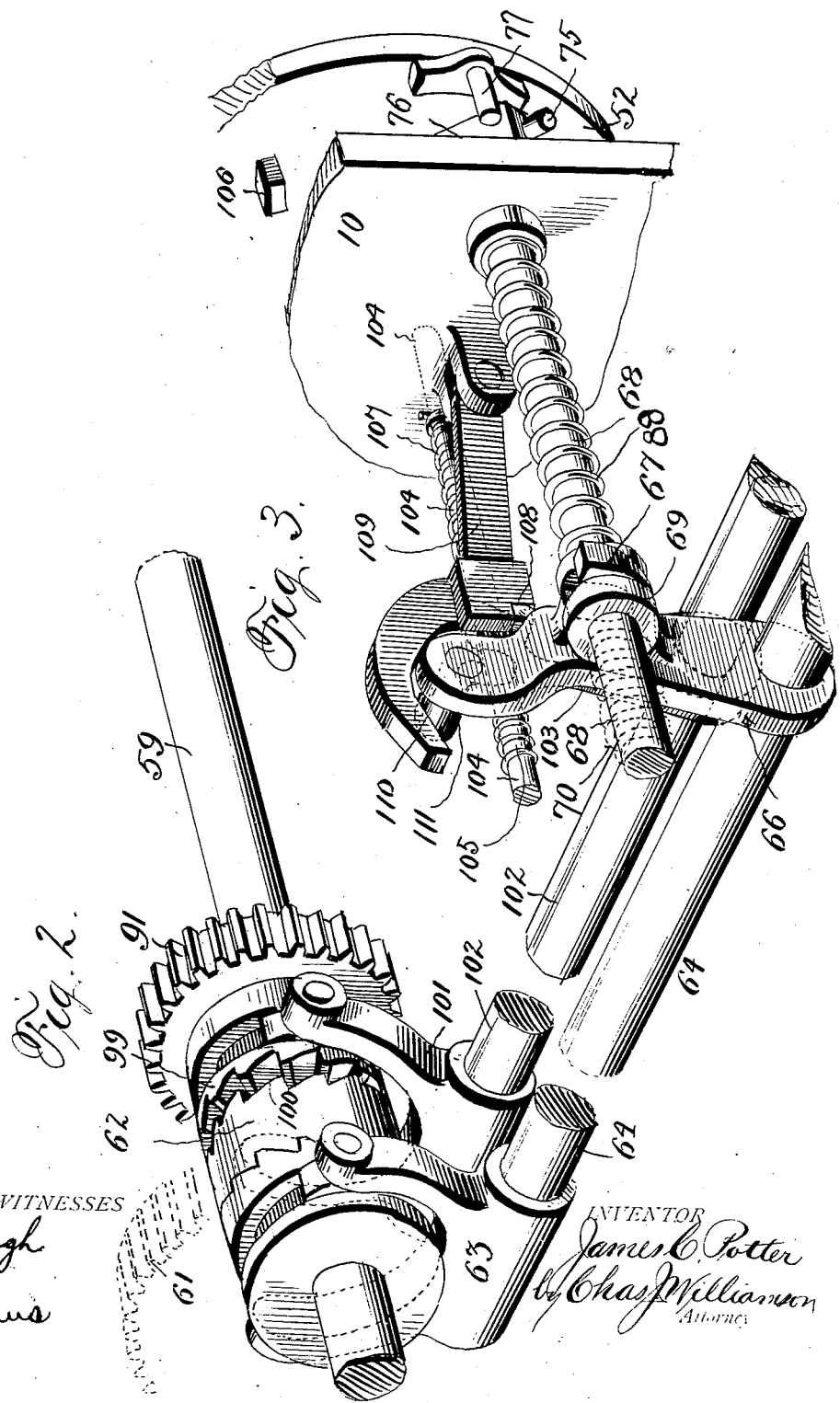

J. C. POTTER.
AUTOMATIC TURRET LATHE.
APPLICATION FILED NOV. 13, 1909.

1,115,973.

Patented Nov. 3, 1914.
4 SHEETS—SHEET 3.

Witnesses
M. L. Pugh
A. B. Evans

Inventor
James C. Potter
by Chas. J. Williamson
Attorney

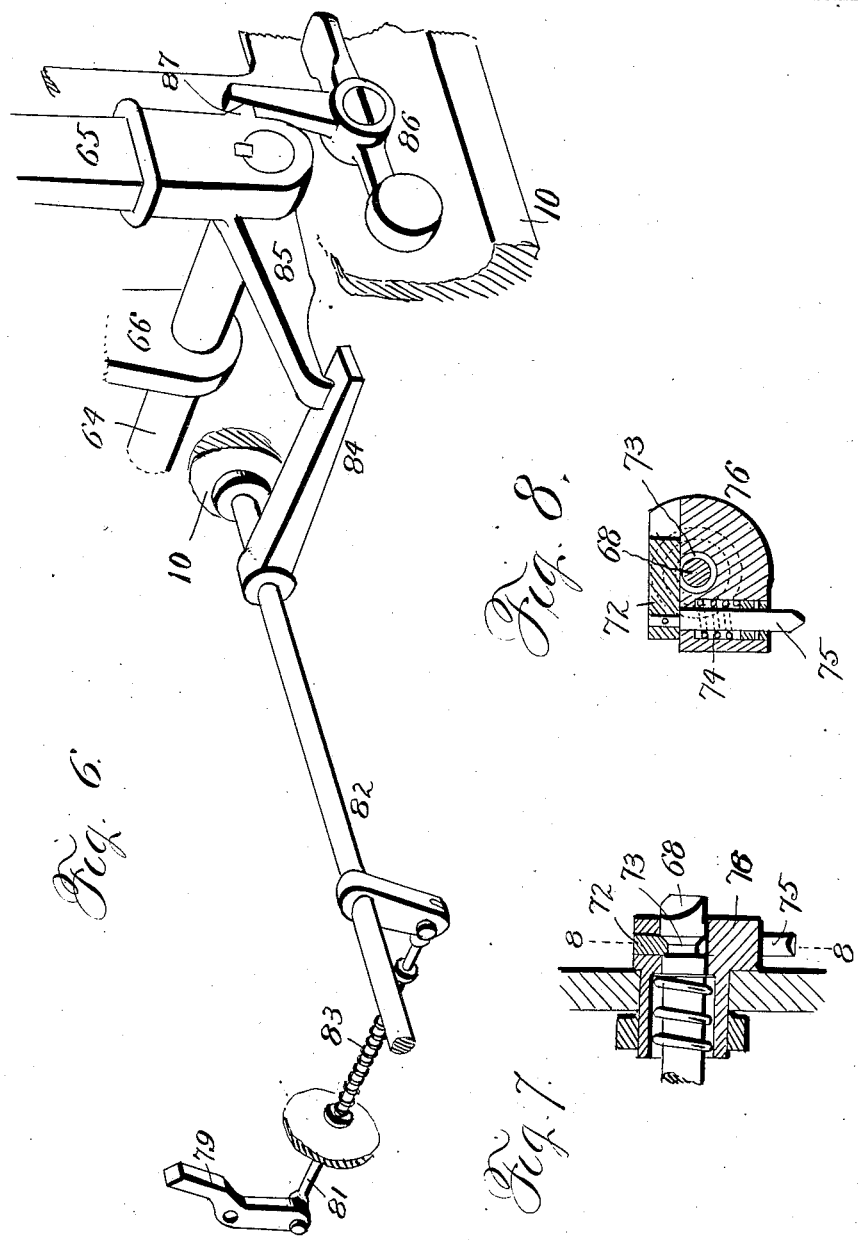

UNITED STATES PATENT OFFICE.

JAMES C. POTTER, OF PROVIDENCE, RHODE ISLAND.

AUTOMATIC TURRET-LATHE.

1,115,973.  Specification of Letters Patent.  Patented Nov. 3, 1914.

Application filed November 13, 1909. Serial No. 527,941.

*To all whom it may concern:*

Be it known that I, JAMES C. POTTER, of Pawtucket, in the county of Providence and in the State of Rhode Island, have invented a certain new and useful Improvement in Automatic Turret-Lathes, and do hereby declare that the following is a full, clear, and exact description thereof.

The productiveness of automatic turret lathes of the cam drum type, as heretofore constructed, has been limited, because although certain operations can be performed with the feed of the turret at a more rapid rate than other operations, yet no provision has been made for increasing the speed with reference to such operations that require a slow feed. Thus, for example, threading and reaming can be done at a higher speed than boring, and yet the limitations of the machine construction have been such that the same rate of feed has been used for threading and reaming as has been used for boring. This means loss of time.

One of the objects of my invention is to remove this speed limitation, and by my invention I have effected a saving of from twenty to thirty per cent. of the time over machines having the speed limitations I have just adverted to.
Another object of my invention is to render safer the operation of chucking and more convenient and expeditious the work of setting the tools for work.

My invention, therefore, consists in the machine having the construction and arrangement of parts substantially as hereinafter specified and claimed.

Figure 1:
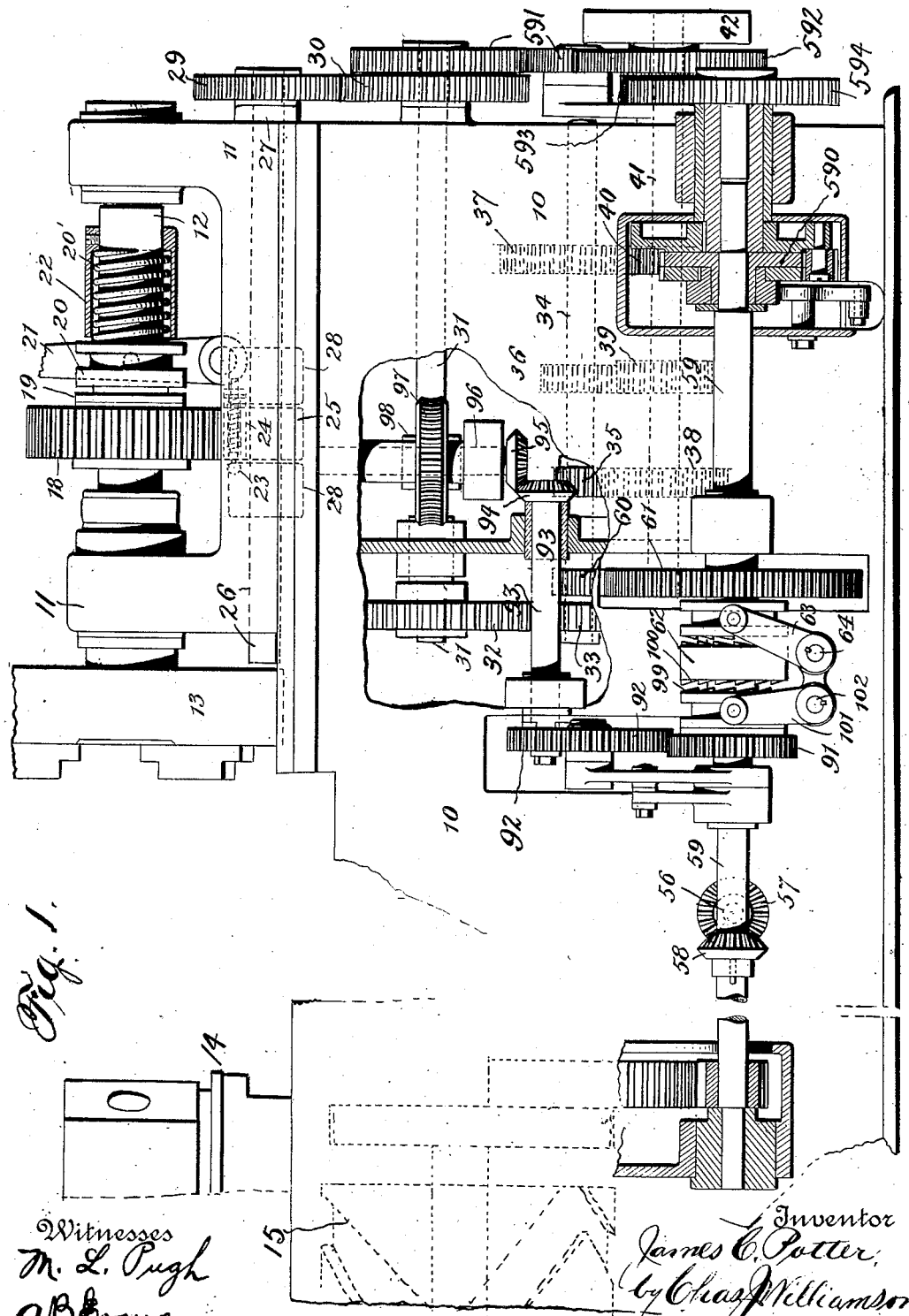
Figure 4:
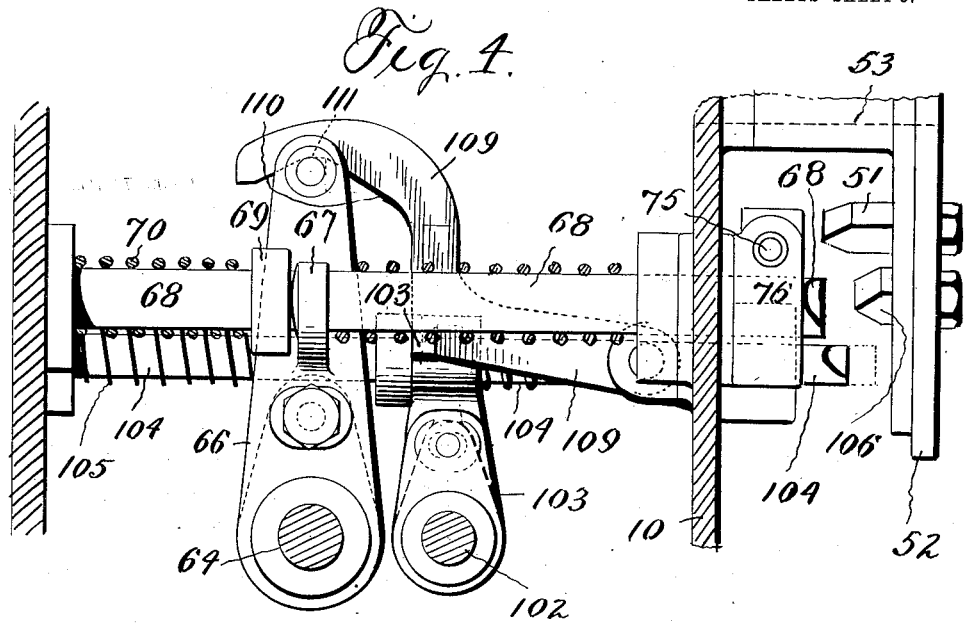
Figure 5:
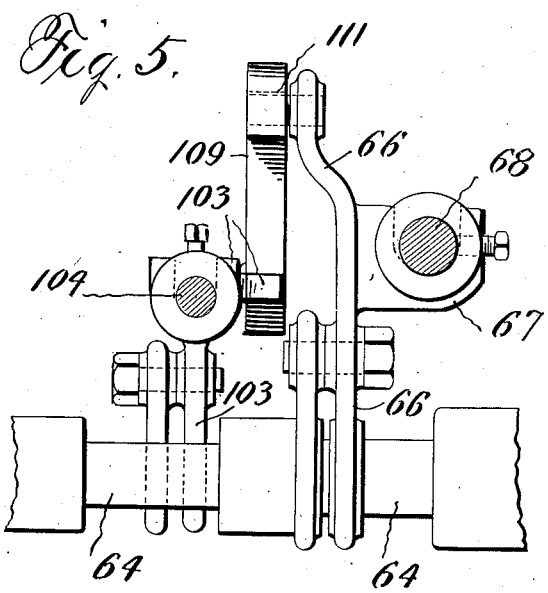

Referring to the drawings, Figure 1 is a view partly in elevation with parts in section and portions broken away of a turret lathe embodying my invention; Fig. 2 is a detail view in perspective of a portion of the feed shaft and the gearing and clutches thereof for driving said shaft at different speeds, the quick return gear being shown as clutched to said shaft and the other gear unclutched therefrom; Fig. 3 a perspective view of the mechanism for controlling the gear connections with the feed shaft, the parts being shown in the position they occupy when the gear for revolving said shaft at a higher working is clutched thereto and locked; Fig. 4 is a detail view in side elevation of said mechanism; Fig. 5 a detail view in end elevation; Fig. 6 is a perspective view of the hand lever-operated stopping mechanism; Figs. 7 and 8 are detail views, in section of the automatic latching device for controlling the throw of the clutch of the quick return gear.

Generally described, the machine illustrated in the drawing as an embodiment of my invention, comprises a supporting frame or bed 10, a head stock 11 having bearings at opposite ends supporting and journaling a work spindle 12, carrying a chuck 13; and a turret slide 14 which is reciprocated by a cam drum 15. Said machine is also provided with a cross slide 16 which is reciprocated by means of a cam drum, all as shown in my pending application Ser. No. 495,474, filed May 12, 1909.

Loose upon the head stock spindle is a spur gear 18 having on one side a clutch face 19 adapted to be engaged by a sliding clutch collar 20 splined to the spindle, and having an operating lever 21. Engaging the clutch collar is one end of a spiral spring 20' that is mounted around the spindle and is preferably inclosed by a sleeve 22 thereon, which spring acts normally to press the clutch collar into engagement with the clutch face of the spur gear, so as to hold the clutch in engaging position against accidental disengagement, practice having shown that accidental disengagement is likely to occur. The lever 21 therefore is provided to move the clutch collar out of engagement with the clutch face on the spur gear, and to overcome or prevent the tendency of the spring to cause engagement at those times when it is desirable to prevent the revolution of the chuck, I provide a latch device which may have the construction shown, it consisting of a spring actuated pin 23, slidable in a casing or barrel 24, and adapted to engage the clutch lever and lock it in the position it occupies when the clutch collar is disengaged from the clutch face. When released from the latch pin the clutch collar is automatically thrown into engagement with the clutch face of the spur gear. The locking of the clutch collar in its disengaged position, and the consequent disconnection of the chuck from its driving gear 18, enables the operation of chucking to be performed with safety to the workman, since the danger of accidental turning of the chuck at such time is prevented. Another very important advantage in the disconnection of this chuck so that the chuck is stationary, is in connection with the matter of setting the tools of the turret and cross slides for work. A sample or specimen piece of work is placed in the chuck and then by power the turret and cross slides may be put through their motions to bring their tools into the proper position to duplicate the sample. Should the chuck revolve under these conditions, since the tools might be incorrectly placed, it would result in damage to the sample or specimen, and it would not only be ruined, but it could not be further used in the operation of setting the tools. The practice heretofore has been to put the turret and cross slide through their motions by hand, which is a tedious and laborious operation.

Although, as I shall hereinafter point out, the spindle and the tool slide operating mechanisms are so connected that they rotate together, in order that changes of speed of spindle and tool may occur in proper time relation (which connecting together of said elements has, with the constructions heretofore employed, rendered necessary the hand operation of the tool slides in setting the tools for work), yet by my present invention it is possible by the disconnection of the chuck to employ the power mechanism of the machine for putting the tool slides through their motions.

Meshing with the spindle gear 18 is a pinion 25 keyed or splined to a horizontally extending shaft 26 supported by a bearing 27 on the frame or bed 10, and a bearing 28 on the under side of the head stock 11, the head stock bearing 28 being split or forked to receive the pinion. On the outer end of the shaft 26 is a gear 29. The gear 29 meshes with a gear 30 beneath it, on a horizontal shaft 31 journaled in bearings in the machine frame 10, and on said shaft 31 is a second gear 32 which meshes with a pinion 33 keyed to the end of a shaft 34 journaled below and parallel with the shaft 31 in bearings in the machine frame 10.

I have devised means by which the shaft 34 may be driven at any one of three different speeds to correspondingly vary the speed of the head stock spindle, because, as will be evident, the spindle, through the train of gearing that I have thus far described, is geared to said shaft 34. Loose on the shaft 34, there are three gears 35, 36 and 37, respectively, of different diameter, which mesh, respectively, with three gears 38, 39 and 40, likewise of different diameter, keyed to the main driving shaft 41, which is mounted in bearings in the frame 10 below and parallel with the shaft 34, and is projected at one end beyond the end of the frame 10, and has fixed to it a pulley 42, which is belted to the countershaft. The mechanism for controlling the gear connections to secure the different speeds referred to, is shown and described in my United States application No. 495,474, hereinbefore referred to.

The shaft 59 is the feed shaft and both the turret slide operating cam drum 15 and the cross slide operating cam drum 17 are geared to it by trains of gearing that need not be described. The speed of the shaft 59, therefore, determines the speed of the tools, and I will now describe the means by which the operation and speed of revolution of the feed shaft 59 may be controlled: In the machine illustrated which embodies my invention, the feed shaft is driven at a constant speed which is the highest desirable to return the turret slide after a turret tool has finished its work, and at various slower speeds while work is being done, to perform the operations of boring, screw-threading and reaming. When the feed shaft 59 is driven at the constant high speed it is desirable that its revolution be independent of the work spindle so as not to be subject to the variations of the speed of the latter, the feed shaft 59 being, therefore, directly driven when it is to rotate at high speed, and for the slower speeds it receives its motion through gearing that is in mesh with the work spindle gear, and which comprises a differential gear 590 and change gears 591 that are in mesh with the gear 30, and through other gearing hereinafter described. The gear connection between the change gears and the differential gear 590 comprises a gear 592 journaled concentric with the main shaft 41 upon a bushing thereon, a pinion 593 attached to said gear 592, and a gear 594 that meshes with said pinion 593, and is connected with the differential gear. The gear connection between the shaft 30 and the differential gear is employed instead of the belt gearing of my hereinbefore mentioned application.

For directly driving the shaft 59 at the constant speed, gear 60 on the main shaft 41 (as in the application before mentioned) meshes with a gear 61 loosely and slidably mounted on the shaft 59, which may be clutched to the shaft 59 by means of a clutch collar 62 keyed to said shaft. For sliding said gear to engage and disengage it from the clutch collar, its hub is engaged by the forked end of a lever 63 on a rock shaft 64 which extends from front to rear of the machine, and on its end projecting at the front of the machine has attached to it a hand lever, by which, at will, the gear 61 may be clutched to and unclutched from the shaft 59. Besides the control of the clutch engagement by hand at the will of the operator, the clutching and unclutching operation is performed automatically. For this purpose, the rock shaft 64 has near its front end a lever 66, which at its free end has an eye 67, through which passes a horizontal rod or bolt 68 that is slidably mounted in suitable bearings in the machine frame 10, and on one side of the eye has a collar 69, which is pressed yieldingly toward the eye by a helical spring 70, which acts to urge the rod or bolt 68 in one direction. For moving the bolt 68 in the opposite direction, and thereby to move the rock shaft lever 63 to unclutch the gear from the back shaft 59, one end of the bolt 68 is carried toward the speed-changing wheel 52, so as to be in the path of a series of cam blocks 51 clamped to the wheel and projecting from the side thereof, which by the revolution of the wheel are brought successively in contact with the beveled end of the bolt 68, and the latter is thereby moved away from the wheel in the direction stated.

When the clutch operating bolt 68 has been moved by a cam block as described, it is locked or held in such position for a predetermined period of time by a latch pin 72, which engages a shoulder formed by an annular groove 73 in the bolt 68, and which is automatically moved to and yieldingly held in latching position by means of a helical spring 74 acting upon a finger 75 of the latch pin whose free end projects beyond the side of the block or head 76, in which the latch is mounted, so as to be in the path of a releasing dog 77 clamped to and projecting from the side of the wheel 52, which dog is placed in such position that at the proper time of revolution of said wheel 52 it will engage said finger and move the latch to free the bolt 68, to permit the latter to be moved under the pressure of its spring 70, to clutch the gear 61 to the feed shaft 59. To enable the pawl 79 of the ratchet wheel of the differential gear 590 to be moved out of and into engagement with said ratchet wheel, it is connected to one end of a pitman 81, whose other end is connected to the crank arm of a rock shaft 82, the movement of the shaft in one direction being produced by the action of a coil spring 83 on the pitman, and in the opposite direction by connections with the rock shaft 64. On the rock shaft 82 is a radial arm 84 which is in the path of the free end of a radial arm 85 projecting from the hand lever 65 on the rock shaft 64, so that by the movement of said lever 65, the pawl 79 of the differential gear moved may be rocked to disengage it from its ratchet wheel 79, and thereby deprive the shaft 59 of power to drive it, and thus stop the machine. When the hand lever 65 is thus moved to stop the machine, it may be locked in such position by means of a dog 86 that engages with a tooth 87 on said hand lever. Besides the stoppage of the machine by hand, provision is made for automatically stopping it, and this consists simply in causing the bolt 68 to move far enough under the action of one of the cam blocks 51 on the wheel 52 to cause the simultaneous unclutching of the gear 61 from the shaft 59, and the disengagement of the differential gear pawl 78. When the bolt 68 is moved sufficiently to disconnect the shaft 59 from both the higher speed gear 61 and differential gear, the free end of the latch-moving finger 75 is removed from the path of its engaging blocks 51, and thus the automatic unlatching of the bolt 68 cannot take place. At times it is desirable to clutch the gear 61 to the shaft 59, even though the clutch-operating bolt 68 is locked in the position to which it is moved to unclutch said gear from the shaft 59, and to enable this to be done by the operation of the hand lever 65, I place upon the bolt 68 a spring 88 weaker than the spring 70, that engages the lever 66 on the side opposite that engaged by the collar 69, which spring constitutes a yielding connection between said sliding bolt and said lever 66 that permits the independent movement of the lever 66 necessary for the purpose stated. It is to be noted that the movement of the sliding bolt 68 to unclutch the gear 61 from the shaft 59, is accomplished while the speed-changing wheel 52 is moving at high speed, and that it is while the speed-changing gear is moving at a low speed the clutching operation takes place, but while this is a fact, the clutching of the gear 61 to the shaft 68 is quickly effected, because all that the speed-changing gear 52 does at that time is to move the latch to release the bolt 68, which is then moved to clutch the gear 61 to the shaft 59 by the action of the spring 70, which being independent of the speed-changing wheel 52 effects the clutching operation quickly, so that loss of time is avoided, which would occur were the revolution of the wheel 52 utilized to move the clutch operating bolt 68 to produce clutching of the gear 61 to the shaft 59. All the mechanism that I have described in connection with the operation of the bolt 68 and the control of the differential gear connection with the feed shaft 59 is fully shown and described in my heretofore referred to pending application.

I will next describe the gearing by which the feed shaft 59 may be driven at working speeds higher than that imparted through the differential gear, to enable the rapid performance of such operations as screw threading and reaming. Loose on the feed shaft 59 is a spur gear 91, which by mechanism hereinafter described, is adapted to be clutched to and unclutched from said shaft 59, and which when clutched thereto, drives it at the desired intermediate speed. By change gears 92 said gear 91 is connected with a short horizontal shaft 93 having at one end a bevel pinion 94 in mesh with a like pinion 95 on the lower end of a vertical shaft 96, to which is keyed a worm wheel 97 in mesh with and driven by a worm 98 on the shaft 31, which it will be remembered is geared to the work spindle 12 so that for the intermediate or higher speed of the feed shaft 59 there is a gear connection between the work spindle and said shaft 59 to secure the desired changes of speed in proper time relation.

The gear 91, like the gear 61 on the feed shaft 59, has a clutch face 99, which by the sliding of the gear 91 may be moved into and out of engagement with a clutch face 100 on the clutch collar 62, which is keyed to the feed shaft 59, and for sliding the gear 91, to clutch it to and unclutch it from the shaft, the hub thereof is engaged by the forked end of a lever 101 on a rock shaft 102 which extends parallel with the rock shaft 64, and which at its front end has a vertically extending crank arm 103. The upper end of the crank arm 103 is forked to straddle a reciprocating bolt 104 parallel with the bolt 68, and said forked end is acted upon on one side by a coil spring 105, which turns the rock shaft 102 in the direction to slide the gear 91 to disengage it from the feed shaft 59, while to move the bolt in the opposite direction to clutch said gear 91 to the feed shaft 59 the end of said bolt is projected so as to be in the path of one or more dogs 106 on the speed-changing wheel 52, which dogs act by a camming action on the bolt to slide it in the direction indicated. Preferably a spring 107 is interposed between the bolt and the forked end of the crank arm 103, to constitute a yielding connection between them to prevent breakage of the parts should there be any obstruction to their movements. When the bolt 104 is moved by the action of the speed-changing wheel to clutch the gear 91 to the shaft 59, a shoulder 108 on a pivoted latch 109 drops into engagement with the forked end of the crank arm 103, and thereby the gear 91 is clutched to the feed shaft 59 for the desired predetermined time. The release of the crank arm 103 to permit the unclutching of the gear 91 to take place is automatically effected as by providing the latch 109 with inclined cam surfaces 110 which are engaged by a stud or roller 111 on the upper end of the crank arm 66 fixed to the rock shaft 64, so that when the latch pin 72 which locks the sliding bolt 68 to maintain the gear 61 in its unclutched position on the feed shaft 59, is released when the time comes to clutch the gear 61 to the feed shaft 59, the unclutching of the gear 91 from the feed shaft 59 simultaneously takes place. By providing the speed-changing gear 52 say with two dogs 106, the gear 91, will by the action of one dog be clutched to the feed shaft 59 to impart to the turret slide the proper speed for a screw-threading operation, and thereafter by the action of the second dog said gear 91 will again be clutched to the feed shaft 59 to move the turret slide at the same speed for a reaming operation.

My speed-changing mechanism is especially advantageous in cutting threads, for it will be apparent in order to cut thread of different pitch, it is necessary merely to change the change gears by which the gear 91 is revolved.

A very important advantage of my speed changing mechanism, in connection with screw cutting, is that since the speed of feed of the die can be adapted to the pitch of thread to be cut, the feed of the die for cutting is a positive one, and a true spiral will be cut, and the danger of crumbling the thread, which exists where the die is mounted loosely, is obviated. It is impracticable by changing the cam plates of the feed drum, to get the variation in speed which is possible by my invention, because either an objectionable enlargement of the diameter of the cam drum would be required, or the cam plates would be too long.

While my variable speed mechanism for the feed shaft is admirably suited for the operations of screw threading and reaming, it is to be understood that my reference to these operations is rather by way of illustration, because I do not limit myself to changes of speed for such operations.

I have not considered it necessary to point out the particulars in which changes may be made in the structure of the machine I have shown and described, but it is to be understood that since my invention may be embodied in machines having members or elements differently constructed and differently combined, the scope of the claims herein is not to be restricted to any particular construction or arrangement of parts.

Having thus described my invention, what I claim is—

1. The combination of a work spindle, a traversable tool holder adapted to carry a series of tools for successive use, a feed shaft, means for imparting motion from the same to the tool holder, gearing for revolving said feed shaft at a certain speed to feed the tool holder for performing work including a member loose on the feed shaft, gearing for revolving said shaft at a relatively higher speed for performing work including a member loose on the feed shaft, automatic means to change the gear connection with said shaft, means connecting the feed shaft and the spindle during the performance of work whereby they rotate together, and whereby the speed of the spindle and the speed of the feed shaft vary together, and a constant speed driving connection with the feed shaft independent of the spindle for moving the tool holder when work is not being done.

2. The combination of a work spindle, a traversable tool holder adapted to carry a series of tools for successive use, a feed shaft, a drive shaft, a plurality of trains of gears for transmitting motion from the drive shaft to the feed shaft, each of said trains including a gear member loose on said feed shaft, means for each of said gear members to operatively connect it with and disconnect it from said feed shaft, and means connecting the work spindle and the feed shaft whereby they rotate together and whereby the speed of the feed shaft and the speed of the spindle vary together, means for varying the speed of the spindle, and a constant speed operative connection between the feed shaft and the drive shaft through one of said plurality of gear trains, independently of the spindle.

3. The combination of a work spindle, a traversable tool holder adapted to carry a series of tools for successive use, a feed shaft, a drive shaft, a gear train, including a differential gear, connecting the drive shaft and the feed shaft, two faster gear trains between the drive shaft and the feed shaft, each of which trains has a gear member loose on the feed shaft, means for connecting with and disconnecting from said feed shaft, each of said gear members loose thereon, an operative connection between each of two of said gear trains with the work spindle, and means for varying the speed of the spindle and with it the speed of the feed shaft through the operative connections between the spindle and the feed shaft, and said third gear train being independent of the spindle and having a constant speed.

4. The combination of a traversable tool holder adapted to carry a series of tools for successive use, a feed shaft, means for imparting motion from the same to the tool holder, a plurality of gears on said shaft, each independently receiving motion, automatic means for connecting each of said gears at a time with said feed shaft, comprising reciprocating bolts, a wheel for actuating said bolts, a locking device for one of said bolts, and means actuated by the other bolt for releasing said locking device.

5. The combination of a traversable tool holder adapted to carry a series of tools for successive use, a feed shaft, means for imparting motion from the same to the tool holder, gearing including a differential gear for revolving said feed shaft at a certain speed to feed the tool holder for performing work, gearing for revolving said shaft at a relatively higher speed for performing work comprising a gear member loose on the shaft and adapted to be operatively connected with and disconnected therefrom, automatic means to change the gear connection with said shaft, a spindle, means to rotate the spindle and the feed shaft together, means to vary the speed of the spindle and gearing, including a gear member loose on the feed shaft, and means to clutch the same thereto and unclutch it therefrom, receiving motion independent of the spindle.

6. The combination of a traversable tool holder adapted to carry a series of tools for successive use, a feed shaft, means for imparting motion from the same to the tool holder, gearing for revolving said feed shaft at a relatively low speed to feed the tool holder for performing work, gearing for revolving said shaft at a relatively high speed, gearing for driving said shaft at an intermediate speed for performing work, automatic means to change the gear connections with said shaft, a spindle, means to gear the spindle and the feed shaft together including a shaft intermediate the spindle and feed shaft, from which intermediate shaft the gear connections branch, by which the working feeds of the tool holder are effected, and means to drive the highest speed gearing independently of the spindle.

7. The combination of a traversable tool holder adapted to carry a series of tools for successive use, a feed shaft, a cam drum for imparting movement to said tool holder, connections between said shaft and said drum, gearing including change gears for revolving said feed shaft at a relatively low speed to feed the tool holder for performing work, gearing including change gears for revolving said shaft at a relatively high speed, gearing for driving said shaft at an intermediate speed for performing work, automatic means to change the gear connections with said shaft, a spindle, means to gear the spindle and the feed shaft together, and means to drive the highest speed gearing independently of the spindle.

In testimony that I claim the foregoing I have hereunto set my hand.

JAMES C. POTTER.

Witnesses:
JOHN JOHNSTON,
CHAS. H. W. ROBERTS.